(12) United States Patent
Ventura et al.

(10) Patent No.: US 8,096,616 B2
(45) Date of Patent: Jan. 17, 2012

(54) FRONT ROW ASSEMBLY HAVING FOLD FLAT MECHANISM WITH FORWARD CUSHION MOVEMENT

(75) Inventors: Kevin J. Ventura, Aschaffenburg (DE); Bernd Winkelhake, Gifhorn (DE); Omar D. Tame, West Bloomfield, MI (US); Peter Paul Zeimis, III, Shelby Township, MI (US)

(73) Assignee: Intier Automotive Seating Systems GmbH, Sailauf (DE)

( * ) Notice: Subject to any disclaimer, the term of this patent is extended or adjusted under 35 U.S.C. 154(b) by 903 days.

(21) Appl. No.: 12/066,574

(22) PCT Filed: Sep. 15, 2006

(86) PCT No.: PCT/EP2006/009017
§ 371 (c)(1),
(2), (4) Date: May 28, 2008

(87) PCT Pub. No.: WO2007/031336
PCT Pub. Date: Mar. 22, 2007

(65) Prior Publication Data
US 2011/0193388 A1    Aug. 11, 2011

(51) Int. Cl.
*B60N 2/30* (2006.01)
(52) U.S. Cl. .............. 297/334; 297/341; 297/378.12; 296/65.09
(58) Field of Classification Search ............. 297/321, 297/322, 334, 341, 378.12; 296/65.01, 65.05, 296/65.09
See application file for complete search history.

(56) References Cited

U.S. PATENT DOCUMENTS

| | | | |
|---|---|---|---|
| 3,311,405 A * | 3/1967 | Brennan et al. | 296/66 |
| 4,269,446 A | 5/1981 | Gersmann et al. | |
| 4,312,537 A | 1/1982 | Lindenberg | |
| 4,805,953 A * | 2/1989 | Yamauchi | 296/65.09 |
| 4,957,321 A * | 9/1990 | Martin et al. | 296/65.09 |
| 5,588,707 A | 12/1996 | Bolsworth et al. | |
| 6,520,581 B1 * | 2/2003 | Tame | 297/336 |
| 6,578,919 B2 | 6/2003 | Seibold et al. | |
| 6,827,404 B2 | 12/2004 | Blair et al. | |
| 6,902,236 B2 * | 6/2005 | Tame | 297/335 |
| 7,121,624 B2 * | 10/2006 | Pejathaya et al. | 297/378.12 |
| 7,255,399 B2 * | 8/2007 | White et al. | 297/378.12 |
| 7,300,107 B2 * | 11/2007 | Kammerer | 297/336 |

FOREIGN PATENT DOCUMENTS

| | | |
|---|---|---|
| EP | 985575 A2 | 3/2000 |
| EP | 1078810 A1 | 2/2001 |
| WO | WO 98/54024 A | 12/1998 |

* cited by examiner

*Primary Examiner* — Peter R. Brown
(74) *Attorney, Agent, or Firm* — Miller Canfield

(57) ABSTRACT

A vehicle seat assembly includes a seat cushion coupled between a pair of risers and a seat back pivotally coupled thereto. A pair of front cushion support links and a pair of rear cushion support links are coupled between the seat cushion and the risers for pivotally supporting and guiding the seat cushion. A fold flat mechanism includes a transfer link operatively coupled between the rear cushion support link and the seat back for transferring pivotal movement of the seat back through the transfer link to each of the front and rear seat cushion support links to automatically move the seat assembly between a seating position wherein the seat back is in an upright position and the seat cushion is spaced above the floor, and a stowed position wherein the seat back is pivoted to a fold flat position and the seat cushion is lying flat against the floor.

14 Claims, 7 Drawing Sheets

US 8,096,616 B2

FRONT ROW ASSEMBLY HAVING FOLD FLAT MECHANISM WITH FORWARD CUSHION MOVEMENT

BACKGROUND OF THE INVENTION

1. Field of the Invention

The invention relates to a seat assembly for an automotive vehicle. More particularly, the invention relates to a seat assembly having a fold flat mechanism for pivoting the seat back flat against the seat cushion while simultaneously moving the seat cushion forward and flat against the floor of the vehicle.

2. Description of the Related Art

Automotive vehicles include seat assemblies for supporting occupants within the vehicle. Seat assemblies are typically arranged within at least a front, or first row, and a rear, or second row, of the vehicle. Each seat assembly typically includes a generally horizontal seat cushion coupled to a generally vertical seat back. It is known in the seating art to provide a stowable seat assembly movable between a seating position for supporting a seat occupant above a floor of the vehicle and a stowed position lying flat against the floor, or nested within a recess formed in the floor. Typically, in such seat assemblies, the seat back is pivotally coupled to the seat cushion for movement between a generally upright position and a forward fold flat position overlying the seat cushion.

Additionally, the seat cushion often includes a four bar linkage mechanism extending between the seat cushion and the floor of the vehicle for moving the seat assembly between a seating position spaced above the floor and a stowed position resting against the floor. The pivotal movement of the seat back is actuated and controlled independently of the movement of the seat cushion, thus requiring separate operation to move the seat assembly from the seating position to the stowed position. Therefore, it remains desirable to provide a mechanism coupled between the seat back and the seat cushion for moving the seat assembly between the seating position and the stowed position in response to pivotal movement of the seat back between the generally upright position and the forward fold flat position.

SUMMARY OF THE INVENTION

According to one aspect of the invention, a seat assembly is adapted to be coupled to the floor of an automotive vehicle. The seat assembly includes a pair of spaced apart risers for mounting the seat assembly to the floor. A seat cushion is coupled between the risers and extends between a forward end and a rearward end. A seat back extends between an upper end and a lower end. A support bracket is adapted to be coupled between the seat back and each of the respective risers. A recliner mechanism is pivotally coupled between the support bracket and the lower end of the seat back for supporting the seat back through pivotal movement between an upright position and a fold flat position overlying the seat cushion. A pair of front cushion support links is coupled between the forward end of the seat cushion and the risers for pivotally supporting and guiding the seat cushion. A pair of rear cushion support links is coupled between the rearward end of the seat cushion and the risers for pivotally supporting and guiding the seat cushion. A fold flat mechanism is operatively coupled between the rearward end of the seat cushion and the lower end of the seat back. The fold flat mechanism includes a transfer link extending between a first end pivotally connected to the rear cushion support link and a second end operatively coupled to the lower end of the seat back for transferring pivotal movement of the seat back through the transfer link to each of the front and rear seat cushion links to automatically move the seat assembly between a seating position, wherein the seat back is in the upright position and the seat cushion is spaced above the floor and a stowed position, wherein the seat back is pivoted to the fold flat position and the seat cushion is lying flat against the floor.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE PREFERRED EMBODIMENT

Figure 1:
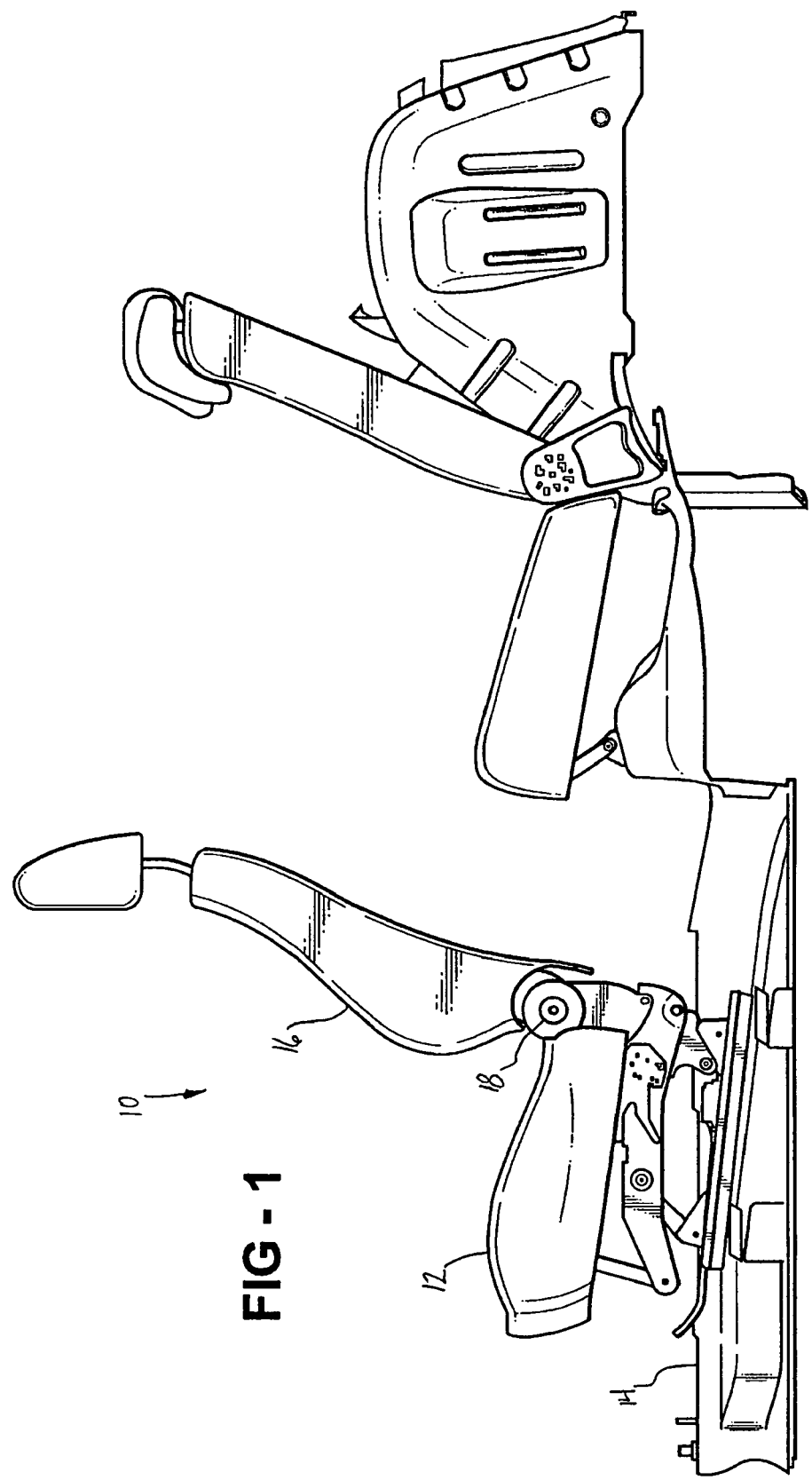
FIG. 1 is a side view of a seat assembly in a seating position spaced above a vehicle floor.
Figure 2:
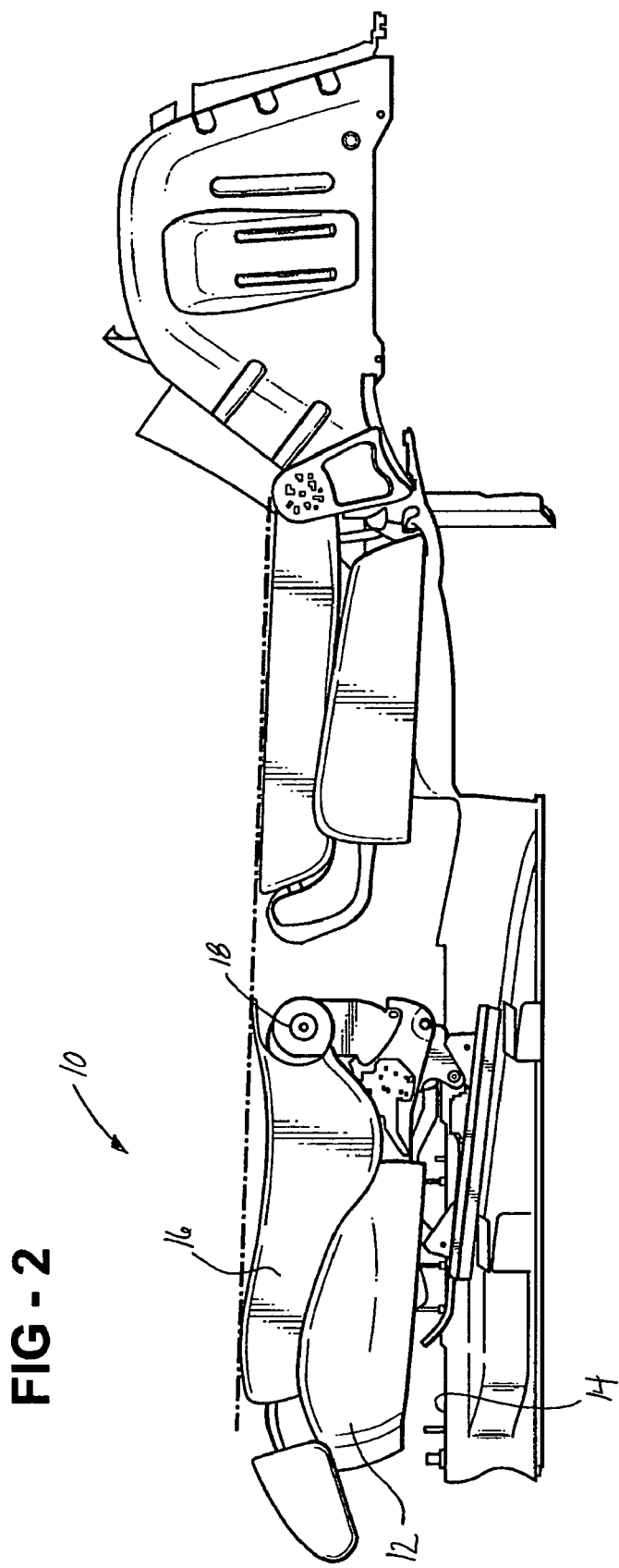
FIG. 2 is a side view of the seat assembly in a stowed position lying flat against the vehicle floor.

Referring to FIGS. 1 and 2, a seat assembly for an automotive vehicle is generally shown at 10. In the first embodiment shown, the seat assembly 10 is for a second row, or passenger row, of the vehicle. It will, however, be appreciated that the seat assembly 10 may be utilized in any seating position within the vehicle without varying from the scope of the invention. The seat assembly 10 includes a seat cushion 12 for supporting a seat occupant above a floor 14 of the vehicle. The seat assembly 10 also includes a seat back 16 operatively coupled to the seat cushion 12 and movable between a generally upright position, shown in FIG. 1, and a forward fold flat position, shown in FIG. 2, overlying the seat cushion 12. A recliner mechanism 18, as is commonly known in the art, is provided for pivotal movement of the seat back 16 between the upright position and the fold flat position. The recliner mechanism 18 may also provide fore and aft pivotal reclining adjustment of the seat back 16 relative to the seat cushion 12 for occupant comfort. The seat assembly 10 is moveable between a seating position, as shown in FIG. 1, wherein the seat back 16 is in the upright position and the seat cushion is spaced above the floor 14 of the vehicle, and a stowed position, as shown in FIG. 2, wherein the seat back 16 is pivoted to the fold flat position and the seat cushion 12 is lying flat against the floor 14.

Figure 3:
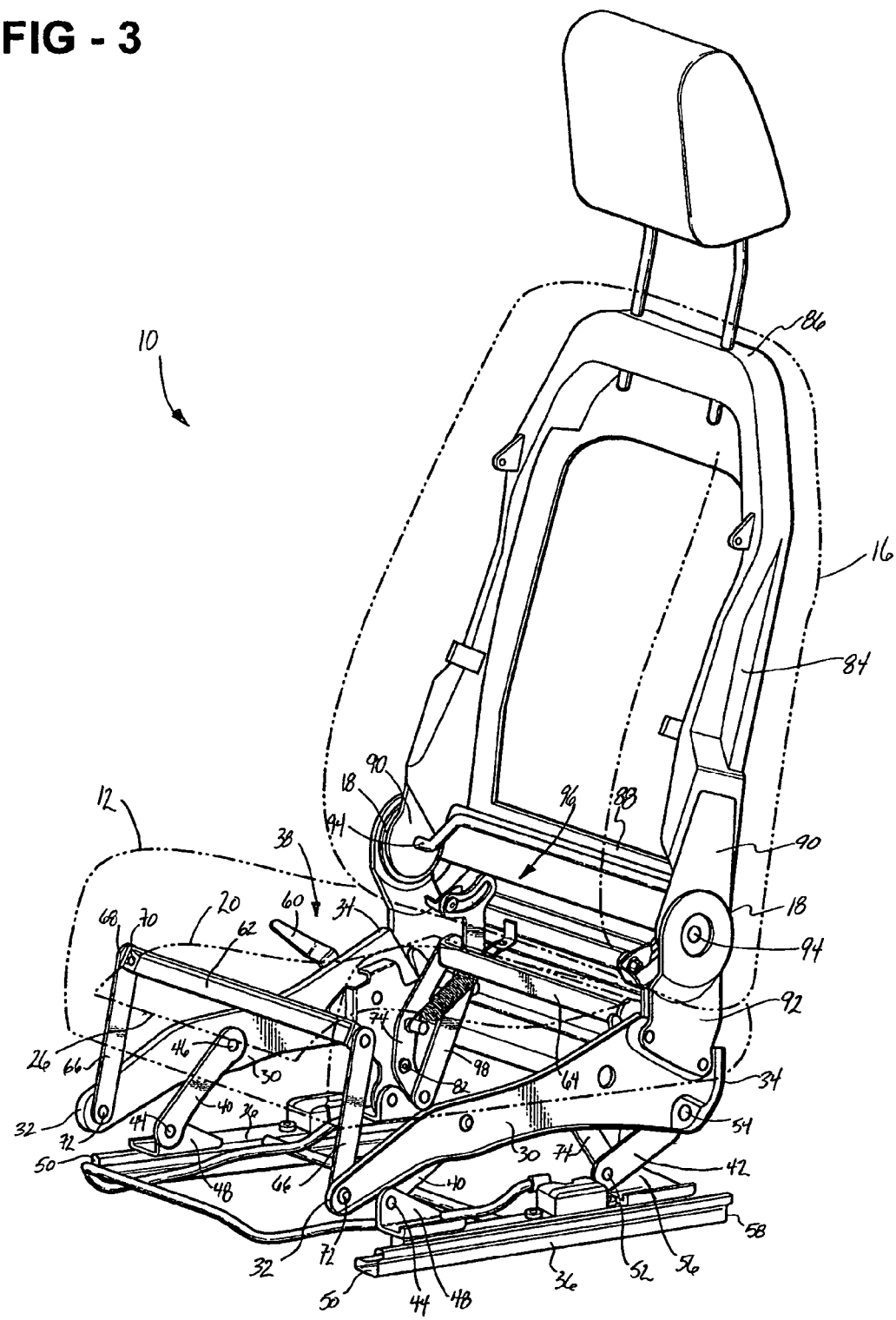
FIG. 3 is a front perspective view of the seat assembly in the seating position including a fold flat mechanism according to a first embodiment of the invention.
Figure 4:
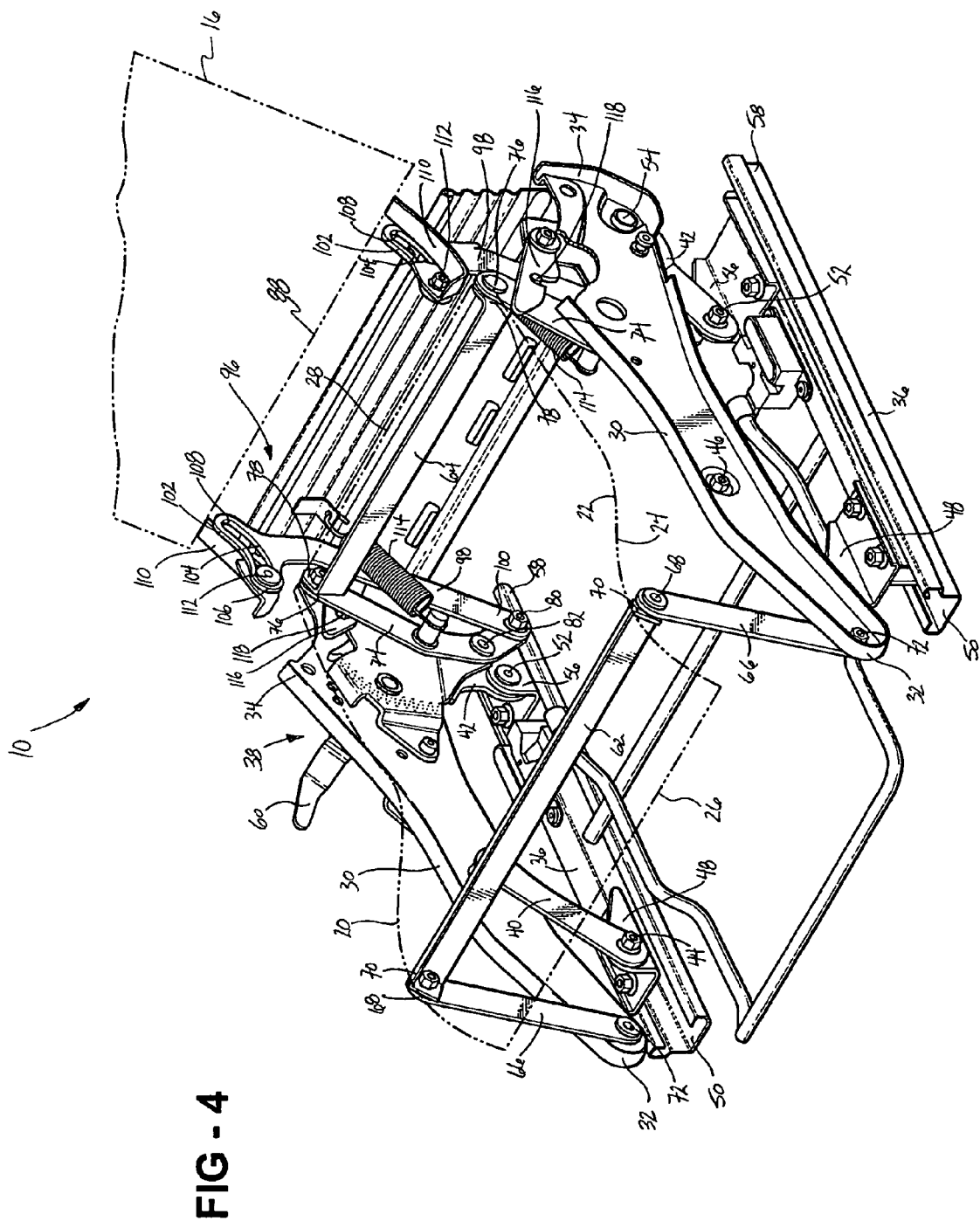
FIG. 4 is a front perspective view of the fold flat mechanism of FIG. 3.
Figure 5:
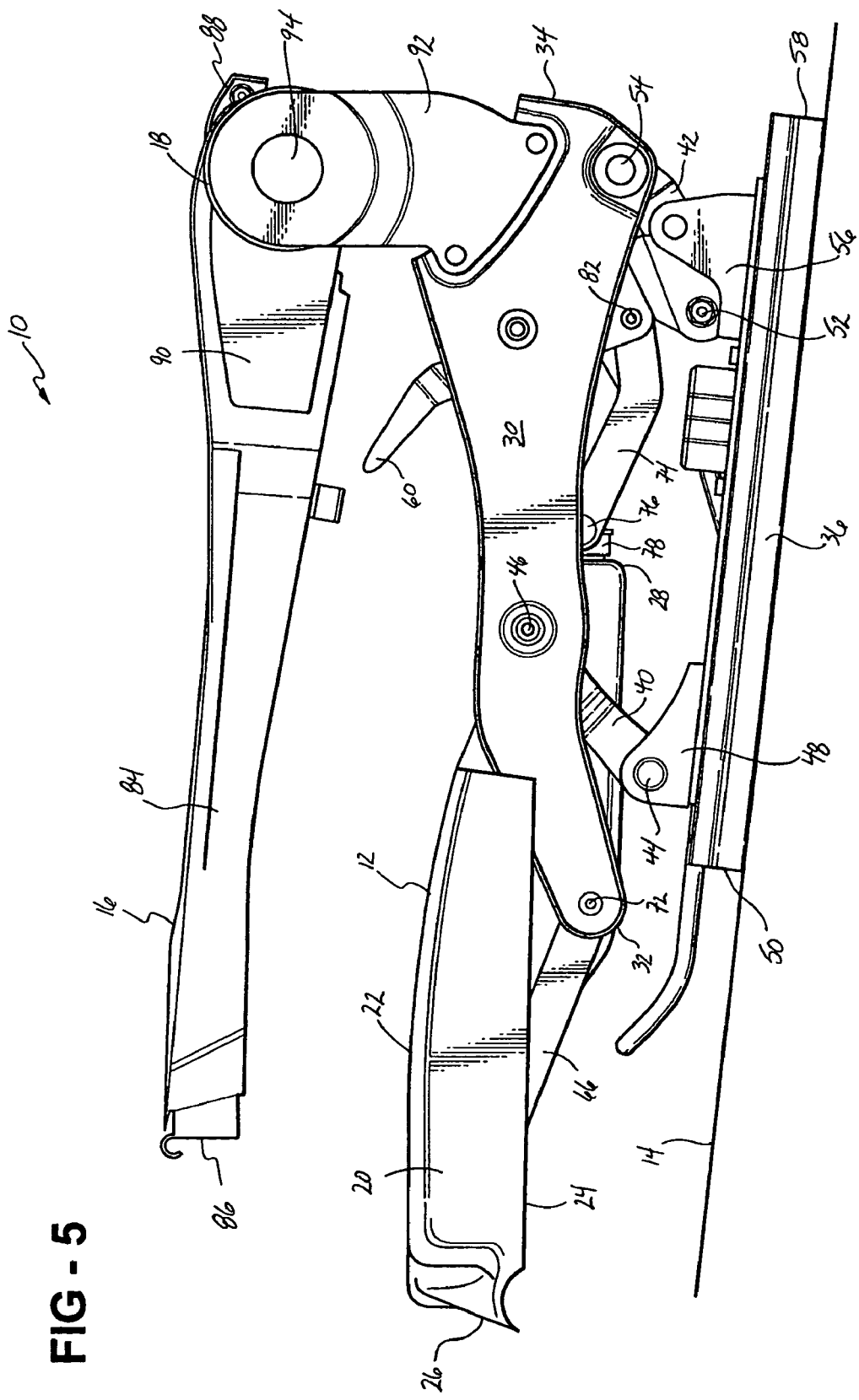
FIG. 5 is a side view of the seat assembly in the stowed position illustrating the fold flat mechanism.

Referring to FIGS. 3 through 5, the seat cushion 12 includes a seat pan 20 having opposing top 22 and bottom 24 contoured surfaces and extending between a forward end 26 and a rearward end 28. The bottom surface 24 of the seat pan 20 is shaped to match a corresponding contour on the floor 14 of the vehicle such that the seat cushion 12 lies flush against the floor 14 when the seat assembly 10 is in the stowed position.

The seat cushion 12 also includes a pair of spaced apart risers 30 positioned on opposing sides of the seat pan 20 for supporting the seat pan 20 and the seat back 16. Each of the risers 30 extend between a forward end 32 and a rearward end 34. A pair of spaced apart track assemblies 36 mounted to the floor 14 of the vehicle provides selective fore and aft sliding adjustment of the seat assembly 10 within the vehicle as is commonly known in the art.

Referring to FIG. 4, a vertical height adjuster or four-bar linkage, generally shown at 38, operatively couples the track assemblies 36 and the risers 30 to provide selective vertical height adjustment of the seat assembly 10 relative to the floor 14 and simultaneously providing fore and aft movement of the seat assembly 10 during vertical height adjustment. More specifically, the vertical height adjuster 38 includes a pair of front adjuster links 40 and a pair of rear adjuster links 42. Each of the front adjuster links 40 extend between a first pivot 44 and a second pivot 46.

The first pivots 44 pivotally connect the front links 40 to a mounting bracket 48 fixedly secured to the respective track assembly 36, adjacent a forward end 50 thereof. The second pivots 46 pivotally connect the front links 40 to the respective riser 30 adjacent the forward end 32 thereof. Each of the rear adjuster links 42 extend between a first pivot 52 and a second pivot 54. The first pivots 52 pivotally connect the rear links 42 to a mounting bracket 56 fixedly secured to the respective track assembly 36, adjacent a rearward end 58 thereof. The second pivots 54 pivotally connect the rear links 42 to the respective riser adjacent the rearward end 34 thereof. The vertical height adjuster 38 also includes an actuator 60 operatively coupled to at least one of the rear adjuster links 42 for actuating the vertical height adjuster 38 thereby pivoting the front 40 and rear 42 adjuster links about the respective first pivots 44, 52 to allow selective vertical height adjustment and simultaneous fore and aft movement of the seat assembly 10.

The seat cushion 12 further includes a front support rod 62 fixedly secured to the bottom surface 24 of the seat pan 20 and extending laterally between opposing sides thereof adjacent the forward end 26. A rear support rod 64 is similarly fixedly secured to the bottom surface 24 and extends laterally between the opposing sides of the seat pan 20 adjacent the rearward end 28. A pair of front cushion support links 66 is pivotally coupled between the front support rod 62 and the risers 30 for pivotally supporting and guiding the seat cushion 12. More specifically, each of the front cushion support links 66 extends between a first end 68 pivotally connected to a distal end 70 of the front support rod 62 and an opposite second end 72 pivotally connected to the forward end 32 of the respective riser 30. A pair of rear cushion support links 74 is pivotally coupled between the rear support rod 64 and the risers 30 for pivotally supporting and guiding the seat cushion 12. More specifically, each of the rear cushion support links 74 extends between a first end 76 pivotally connected to a distal end 78 of the rear support rod 64 and an opposite second end 80. Preferably, each rear cushion support link 74 has a curvature or bend between the first 76 and second 80 ends. The rear cushion support links 74 are pivotally connected to the rearward end 34 of the respective riser 30 by an intermediate pivot pin 82 positioned between the first 76 and second 80 ends.

Referring to FIGS. 4 and 5, the seat back 16 includes a seat back frame 84 extending between an upper end 86 and lower end 88. A recliner bracket 90 extends from each side of the seat back frame 84 adjacent the lower end 88 thereof. A support bracket 92 is pivotally coupled to each of the recliner brackets 90 and each support bracket 92 is fixedly secured to the rearward end 34 of the respective riser 30 for pivotally supporting the seat back 16 between the upright position and the fold flat position. Each recliner mechanism 18 includes a recliner pivot shaft 94 pivotally connecting the recliner bracket 90 and the support bracket 92 to provide pivotal movement of the seat back 16 between the upright and fold flat positions.

Referring to FIGS. 3 and 4, both lateral sides of the seat assembly 10 include a fold flat mechanism, generally shown at 96. Each fold flat mechanism 96 is operatively coupled between the seat cushion 12 and seat back 16 for automatically moving the seat assembly 10 between the seating position and the stowed position in response to pivotal movement of the seat back 16 between the upright position and the fold flat position. The fold flat mechanism 96 includes a transfer link 98 extending between opposite first 100 and second 102 ends. The first end 100 is pivotally connected to the second end 80 of the rear cushion support link 74. The second end 102 is defined by an arcuate, elongated slot 104 extending between opposite front 106 and back 108 ends and is operatively coupled to the lower end 88 of the seat back frame 84. More specifically, a connecting bracket 110 is fixedly secured to the lower end 88 of the seat back frame 84. A guide pin 112 extending laterally from the connecting bracket 110 is disposed in the arcuate slot 104 for sliding movement therein between the front 106 and back 108 ends to provide a lost motion connection between the seat cushion 12 and seat back 16. A bias spring 114 extends between the rear cushion support link 74 and the lower end 88 of the seat back frame 84 for biasing the seat assembly 10 to the seating position. Finally, a latch 116 is pivotally connected to the riser 30 for hooking engagement with a post 118 projecting from the rear cushion support link 74 to selectively lock the seat assembly 10 in the seating position.

In operation, starting with the seat assembly 10 in the seating position, the seat cushion 12 is supported by the seat pan 20 and spaced above the floor 14 of the vehicle by the front cushion support links 66 and the rear cushion support links 74 as shown in FIGS. 1, 3, and 4. The seat back 16 is supported in the upright position by the recliner brackets 90. To move the seat assembly 10 from the seating position to the stowed position, the latch 116 is released from the post 118 by any release lever or means commonly known in the art and the recliner mechanism 18 is released by any means commonly known in the art to unlock and allow the seat back 16 to pivot forwardly about the recliner pivot shaft 94 toward the fold flat position shown in FIGS. 2 and 5. Initially, the seat back 16 pivots independently of any movement of the seat cushion 12. The independent pivotal movement of the seat back 16 is provided by the lost motion connection between the transfer link 98 and the seat back frame 84. As the seat back 16 pivots forwardly, the guide pin 112 travels along the arcuate slot 104 from the front end 106 to the back end 108. Once the guide pin 112 abuts the back end 108 of the arcuate slot 104 the continued pivotal movement of the seat back 16 pulls upwardly on the transfer link 98. The transfer link 98, in turn, pulls upwardly on the lower, second end 80 of the rear cushion support link 74 to pivot the rear cushion support link 74 in a first direction about the intermediate pivot pin 82. The pivotal movement of the rear cushion support link 74 in the first direction moves the upper, first end 76 of the rear cushion support link 74 forwardly and downwardly which causes forward and downward movement of the front cushion support link 66. The pivotal movement of the front 66 and rear 74 cushion support links moves the seat pan 20, and thus the seat cushion 12, forwardly and downwardly relative to the risers 30 toward the floor 14 of the vehicle. Thus, in response to pivotal movement of the seat back 16 from the upright position to the fold flat position, the fold flat mechanism 96 automatically moves the seat cushion 12 forwardly and downwardly until the seat cushion 12 is lying flat against the floor 14 of the vehicle and the seat assembly 10 is in the stowed position, as shown in FIG. 5.

To return the seat assembly 10 to the seating position, the seat back 16 is simply pivoted upwardly away from the seat cushion 12 from the fold flat position to the upright position. As the seat back 16 pivots upwardly, the guide pin 112 travels along the arcuate slot 104 from the back end 108 to the front end 106. Once the guide pin 112 abuts the front end 106 of the arcuate slot 104 the continued pivotal movement of the seat back 16 pushes downwardly on the transfer link 98. The transfer link 98, in turn, pushes downwardly on the lower, second end 80 of the rear cushion support link 74 to pivot the rear cushion support link 74 in a second direction about the intermediate pivot pin 82. The pivotal movement of the rear cushion support link 74 in the second direction moves the upper, first end 76 of the rear cushion support link 74 upwardly and rearwardly which causes upward and rearward movement of the front cushion support link 66. The pivotal movement of the front 66 and rear 74 cushion support links moves the seat pan 20, and thus the seat cushion 12, upwardly and rearwardly relative to the risers 30 away from the floor 14 of the vehicle. Thus, in response to pivotal movement of the seat back 16 from the fold flat position to the upright position, the fold flat mechanism 96 automatically moves the seat cushion upwardly and rearwardly until the seat cushion 12 is spaced above the floor 14 and the seat assembly 10 is in the seating position, as shown in FIG. 3.

Figure 6:
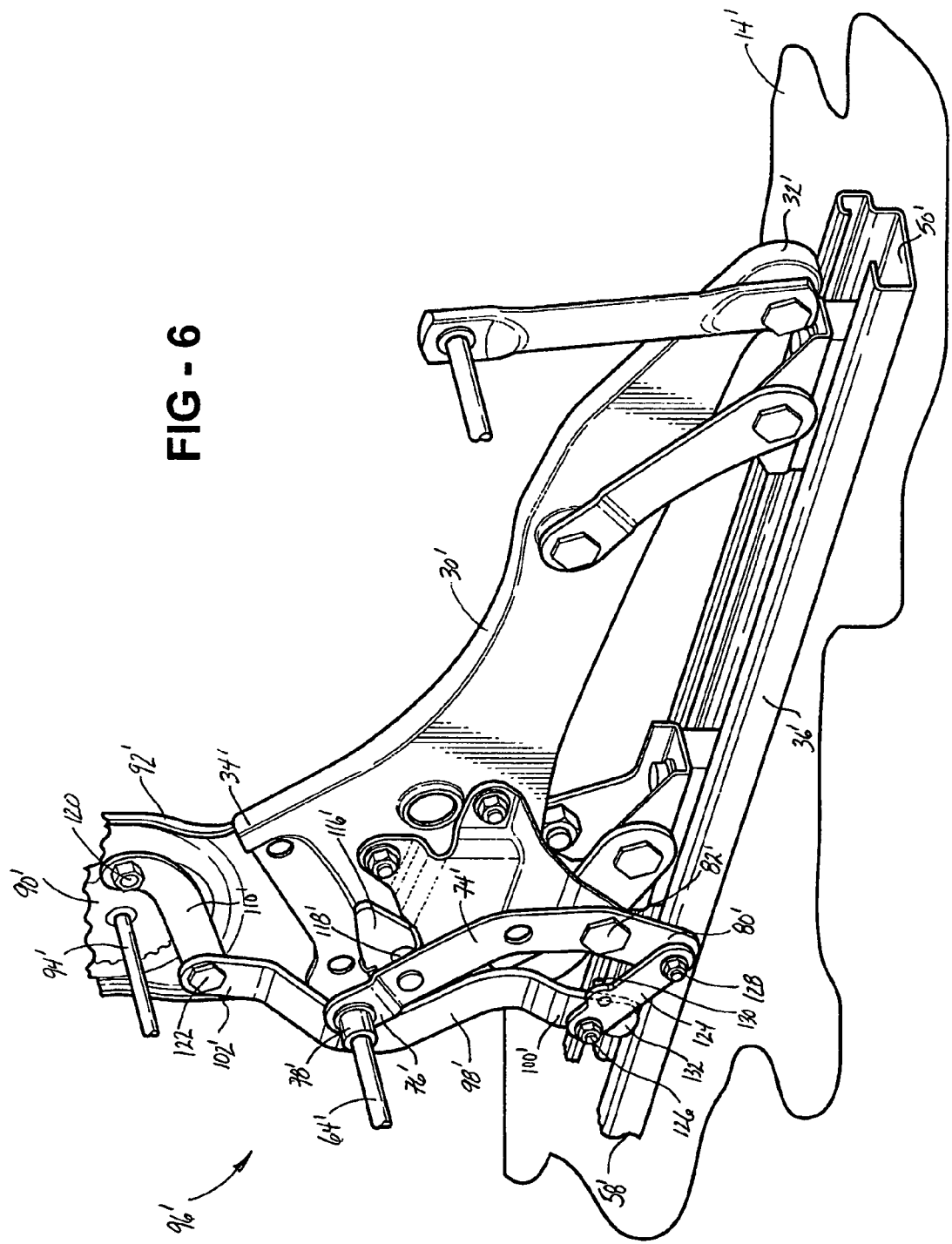
FIG. 6 is a partial, front perspective view of one side of a seat assembly in a seating position including a fold flat mechanism according to a second embodiment of the invention.
Figure 7:
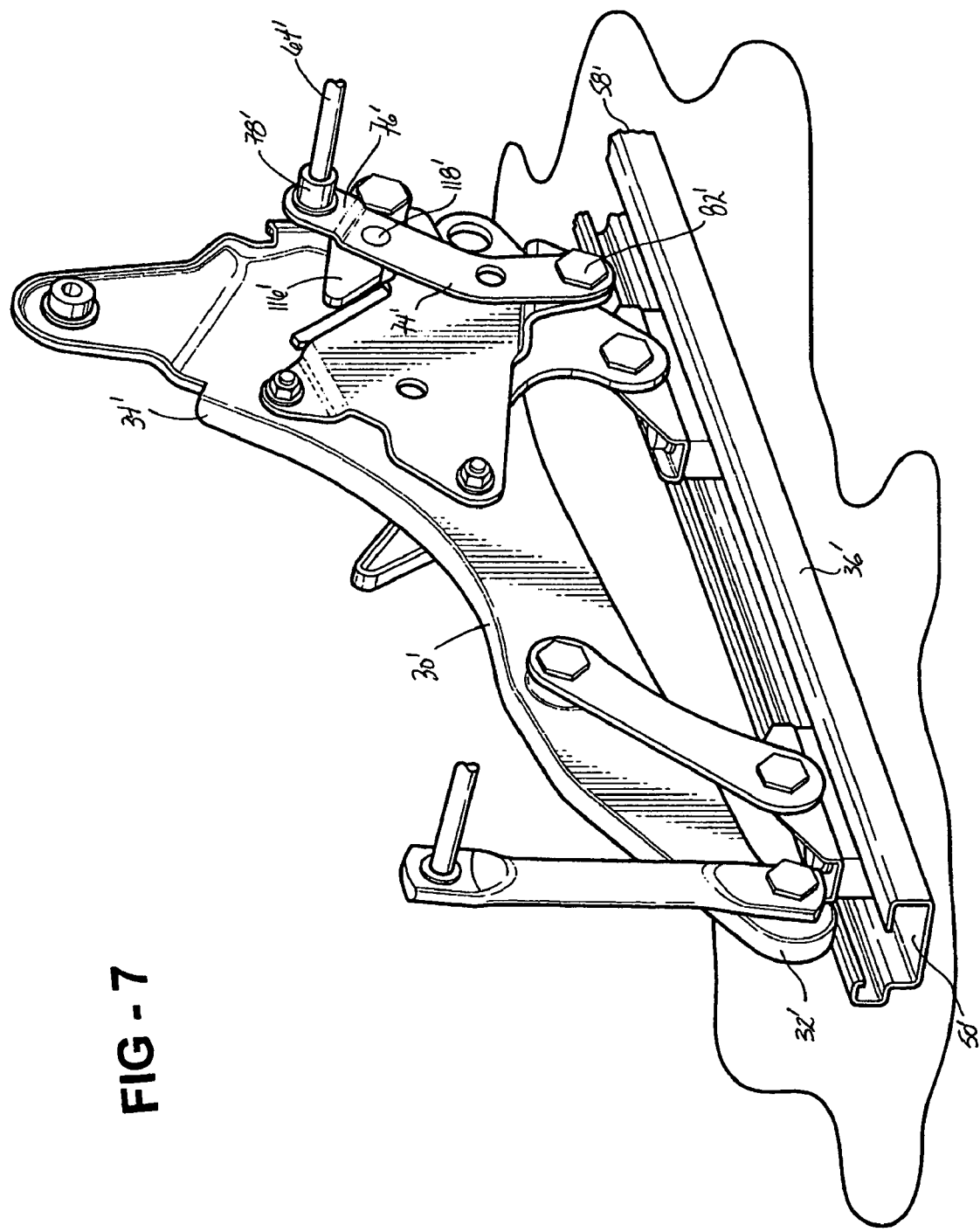
FIG. 7 is a partial, front perspective view of an opposite side of the seat assembly of FIG. 6.

Referring to FIGS. 6 and 7, wherein like primed reference numerals represent similar elements as those described above, in a second embodiment of the invention, one lateral side of the seat cushion 12' and seat back 16' are operatively coupled by the fold flat mechanism 96'. Referring to FIG. 6, the fold flat mechanism 96' includes a transfer link 98' extending between opposite first 100' and second 102' ends. The first end 100' is operatively coupled to the rear cushion support link 74' and the second end 102' is operatively coupled to the seat back frame 84'. More specifically, the fold flat mechanism 96' includes a connecting bracket 110' having a first end 120 fixedly secured to the recliner bracket 90' of the seat back frame 84' and a second end 122 pivotally connected to the second end 102' of the transfer link 98'. The fold flat mechanism 96' also includes a lost motion link 124 having a first end 126 pivotally connected to the first end 100' of the transfer link 98' and an opposite second end 128 pivotally connected to the second end 80' of the rear cushion support link 74'. The lost motion link 124 provides a lost motion connection between the seat cushion 12' and seat back 16'. A transfer pin 130 projects laterally outward from the lost motion link 124 between the first 126 and second 128 ends thereof for abutting a distal end 132 of the transfer link 98' extending beyond the first end 100'. Finally, a latch 116' is pivotally connected to the riser 30' for hooking engagement with a post 118' projecting from the rear cushion support link 74' to selectively lock the seat assembly 10' in the upright seating position.

Referring to FIG. 7, the fold flat mechanism 96' is operatively coupled to and actuates the rear cushion support link 74' on the other lateral side of the seat assembly 10'. More specifically, the rear support rod 64' extends laterally between the first ends 76' of the rear cushion support links 74'.

In operation, to move the seat assembly 10' from the seating position to the stowed position, the latch 116' is released from the post 118' by any release lever or means commonly known in the art and recliner mechanism 18' is released by any means commonly known in the art to unlock and allow the seat back 16' to pivot forwardly about the recliner pivot shaft 94' toward the fold flat position. Similar to that described above with respect to the first embodiment, initially the seat back 16' pivots independently of any movement of the seat cushion 12'. The independent pivotal movement of the seat back 16' is provided by the lost motion connection between the transfer link 98' and the rear cushion support link 74'. As the seat back 16' pivots forwardly, the connecting bracket 110' pulls upwardly on the transfer link 98'. The transfer link 98', in turn, pulls upwardly on the first end 126 of the lost motion link 124 causing the lost motion link 124 to pivot in a first direction about the second end 128 thereof. Once the transfer pin 130 abuts the distal end 132 of the transfer link 98' further pivotal movement between the transfer link 98' and the lost motion link 124 is prevented. The transfer link 98' and lost motion link 124 now move upwardly together, as a single link pulling on the lower, second end 80' of the rear cushion support link 74' to pivot the rear cushion support link 74' in the first direction about the intermediate pivot pin 82'. The pivotal movement of the rear cushion support link 74' in the first direction moves the upper, first end 76' of the rear cushion support link 74' forwardly and downwardly which causes forward and down-ward movement of the front cushion support link 66'. At the same time, the rear support rod 64' causes the rear cushion support link 74' on the other lateral side of the seat assembly 10' to pivot in the first direction about the intermediate pivot pin 828'. The pivotal movement of the front 66' and rear 74' cushion support links moves the seat pan 20', and thus the seat cushion 12', forwardly and downwardly relative to the risers 30' toward the floor 14' of the vehicle. Thus, in response to pivotal movement of the seat back 16' from the upright position to the fold flat position, the fold flat mechanism 96' automatically moves the seat cushion 12' forwardly and downwardly until the seat cushion 12' is lying flat against the floor 14' of the vehicle and the seat assembly 10' is in the stowed position.

To return the seat assembly 10' to the seating position, the seat back 16' is simply pivoted upwardly away from the seat cushion 12' from the fold flat position to the upright position. As the seat back 16' pivots upwardly, the connecting bracket 110' pushes downwardly on the transfer link 98'. The transfer link 98' and the lost motion link 124 moving downwardly as the single link, push on the lower, second end 80' of the rear cushion support link 74' to pivot the rear cushion support link 74' in a second direction about the intermediate pivot pin 82'. The pivotal movement of the rear cushion support link 74' in the second direction moves the upper, first end 76' of the rear cushion support link 74' upwardly and rearwardly which causes upward and rearward movement of the front cushion support links 66'. At the same time, the rear support rod 64' causes the rear cushion support link 74' on the other lateral side of the seat assembly 10' to pivot in the second direction about the intermediate pivot pin 82'. The pivotal movement of the front 66' and rear 74' cushion support links moves the seat pan 20', and thus the seat cushion 12', upwardly and rearwardly relative to the risers 30' away from the floor 14' of the vehicle. Thus, in response to pivotal movement of the seat back 16' from the fold flat position to the upright position, the fold flat mechanism 96' automatically moves the seat cushion 12' upwardly and rearwardly until the seat cushion 12' is spaced above the floor 14' and the seat assembly 10' is in the stowed position.

The invention has been described here in an illustrative manner, and it is to be understood that the terminology used is intended to be in the nature of words or description rather than limitation. Many modifications and variations of the present invention are possible in light of the above teachings. It is, therefore, to be understood that within the scope of the appended claims, the invention may be practiced other than as specifically enumerated within the description.

The invention claimed is:

1. A seat assembly adapted to be coupled to the floor of an automotive vehicle, said seat assembly comprising:
a pair of spaced apart risers for mounting the seat assembly to the floor;
a seat cushion coupled between said risers, said seat cushion extended between a forward end and a rearward end;
a seat back extending between an upper end and a lower end;
a recliner mechanism pivotally coupled between each of said risers and said lower end of said seat back for supporting said seat back through pivotal movement between an upright position and a fold flat position overlying said seat cushion;
a pair of front cushion support links coupled between said forward end of said seat cushion and said risers for pivotally supporting and guiding said seat cushion;
a pair of rear cushion support links coupled between said rearward end of said seat cushion and said risers for pivotally supporting and guiding said seat cushion; and
a fold flat mechanism operatively coupled between said rear cushion support links and said lower end of said seat back, said fold flat mechanism including a transfer link extending between a first and pivotally connected to said rear cushion support link and a second end operatively coupled to said lower end of said seat back for transferring pivotal movement of said seat back through said transfer link to each of said front and rear cushion support links to automatically move said seat assembly between a seating position, wherein said seat back is in said upright position and said seat cushion is spaced above the floor and a stowed position, wherein said seat back is pivoted to said fold flat position and said seat cushion is lying flat against the floor, and wherein said second end of said transfer link includes an arcuate elongated slot extending between opposite front and back ends and a connecting bracket fixedly secured to said lower end of said seat back including a guide pin extending into said arcuate slot for sliding movement therein between said front and back ends to provide a lost motion connection between said seat cushion and said seat back during said pivotal movement of said seat back.

2. A seat assembly as set forth in claim 1 wherein each of said rear cushion support links extends between a first end and an opposite second end, said first end of each of said rear cushion support links is pivotally connected to said rearward end of said seat cushion and each of said rear cushion support links is pivotally connected to said riser by an intermediate pivot pin positioned between said first and second ends.

3. A seat assembly as set forth in claim 2 wherein said first end of said transfer link is pivotally connected to said second end of said rear cushion support link.

4. A seat assembly as set forth in claim 3 including a latch pivotally connected to said riser for hooking engagement with a post projecting from said rear cushion support link to selectively lock said seat assembly in said seating position.

5. A seat assembly as set forth in claim 4 including a pair of support brackets adapted to be coupled between said seat back and said risers.

6. A seat assembly as set forth in claim 5 wherein said recliner mechanism is pivotally coupled between each of said pair of support brackets and said lower end of said seat back.

7. A seat assembly adapted to be coupled to the floor of an automotive vehicle, said seat assembly comprising:
a pair of spaced apart risers for mounting the seat assembly to the floor;
a seat cushion coupled between said risers, said seat cushion extending between a forward end and a rearward end;
a seat back extending between an upper end and a lower end;
a recliner mechanism pivotally coupled between each of said risers and said lower end of said seat back for supporting said seat back through pivotal movement between an upright position and a fold flat position overlying said seat cushion;
a pair of front cushion support links coupled between said forward end of said seat cushion and said risers for pivotally supporting and guiding said seat cushion;
a pair of rear cushion support links coupled between said rearward end of said seat cushion and said risers for pivotally supporting and guiding said seat cushion; and
a fold flat mechanism operatively coupled between said rearward end of said seat cushion and said lower end of said seat back, said fold flat mechanism including a transfer link extending between a first end and a second end, a connecting bracket extending between a first end coupled to said lower end of said seat back and a second end pivotally connected to said second end of said transfer link, and a lost motion link extending between a first end pivotally connected to said rear cushion support link and a second end pivotally connected to said first end of said transfer link, said fold flat mechanism transferring pivotal movement of said seat back through said connecting bracket, said transfer link, and said lost motion link to each of said front and rear seat cushion support links to automatically move said seat assembly between a seating position, wherein said seat back is in said upright position and said seat cushion is spaced above the floor and a stowed position, wherein said seat back is pivoted to said fold flat position and said seat cushion is lying flat against the floor.

8. A seat assembly as set forth in claim 7 wherein said pivotal connection between said lost motion link and said transfer link provides a lost motion connection between said seat cushion and said seat back during said pivotal movement of said seat back.

9. A seat assembly as set forth in claim 8 wherein said lost motion link includes a transfer pin projecting laterally therefrom for abutting a distal end of said transfer link extending beyond said first end of said transfer link to prevent further pivotal movement between said transfer link and said lost motion link.

10. A seat assembly as set forth in claim 9 wherein each of said rear cushion support links extends between a first end and an opposite second end, said first end of each said rear cushion support link is pivotally connected to said rearward end of said seat cushion and each said rear cushion support link is pivotally connected to said riser by an intermediate pivot pin positioned between said first and second ends.

11. A seat assembly as set forth in claim 10 wherein said first end of said lost motion link is pivotally connected to said second end of said rear cushion support link.

12. A seat assembly as set forth in claim 11 including a latch pivotally connected to said riser for hooking engagement with a post projecting from said rear cushion support link to selectively lock said seat assembly in said seating position.

13. A seat assembly as set forth in claim 12 including a pair of support brackets adapted to be coupled between said seat back and said risers.

14. A seat assembly as set forth in claim 13 wherein said recliner mechanism is pivotally coupled between each of said pair of support brackets and said lower end of said seat back.

* * * * *